(12) United States Patent
Zhang

(10) Patent No.: US 9,131,027 B2
(45) Date of Patent: Sep. 8, 2015

(54) METHOD, SYSTEM, AND CLIENT FOR STREAMING MEDIA SERVICE

(71) Applicant: Huawei Technologies Co., Ltd., Shenzhen, Guangdong (CN)

(72) Inventor: Shaobo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 13/889,932

(22) Filed: May 8, 2013

(65) Prior Publication Data

US 2013/0254418 A1 Sep. 26, 2013

Related U.S. Application Data (63) Continuation of application No. PCT/CN2011/074868, filed on May 30, 2011.

(30) Foreign Application Priority Data

Nov. 8, 2010 (CN) .......................... 2010 1 0534936

(51) Int. Cl.
    H04L 29/06 (2006.01)
(52) U.S. Cl.
    CPC ............ *H04L 65/60* (2013.01); *H04L 65/4084* (2013.01); *H04L 65/4092* (2013.01); *H04L 65/607* (2013.01); *H04L 65/80* (2013.01)
(58) Field of Classification Search
    CPC ....... H04L 65/60; H04L 65/607; H04L 65/80; H04L 65/4092; H04L 65/4084
    USPC ........................................................ 709/231
    See application file for complete search history.

(56) References Cited

U.S. PATENT DOCUMENTS

| | | | | |
|---|---|---|---|---|
| 6,230,162 B1 * | 5/2001 | Kumar et al. | ................. | 382/240 |
| 7,792,982 B2 * | 9/2010 | Padmanabhan et al. | ...... | 709/231 |
| 8,995,307 B2 * | 3/2015 | Greenslade et al. | .......... | 370/265 |
| 2004/0120417 A1 * | 6/2004 | Lynch et al. | ................. | 375/272 |
| 2006/0023748 A1 * | 2/2006 | Chandhok et al. | ............ | 370/469 |

(Continued)

FOREIGN PATENT DOCUMENTS

| | | |
|---|---|---|
| CN | 1988547 A | 6/2007 |
| CN | 101005364 A | 7/2007 |

(Continued)

OTHER PUBLICATIONS

International Search Report dated Sep. 8, 2011 in connection with International Patent Application No. PCT/CN2011/074868.

(Continued)

*Primary Examiner* — Kostas Katsikis (57) ABSTRACT

A method includes: obtaining, by a client, a media presentation description file, where the media presentation description file includes a priority level of a coding representation group of media; selecting a coding representation group according to the priority level of the coding representation group and a current network bandwidth, and selecting one coding representation from each selected coding representation group; and requesting, according to address information that is of the selected coding representation and is obtained by parsing the media presentation description file, a media segment of the coding representation from a server that is indicated by the address information.

8 Claims, 3 Drawing Sheets

(56) References Cited

U.S. PATENT DOCUMENTS

| | | | |
|---|---|---|---|
| 2007/0067297 A1* | 3/2007 | Kublickis | 707/9 |
| 2007/0076591 A1* | 4/2007 | Khan | 370/216 |
| 2008/0109532 A1* | 5/2008 | Denoual et al. | 709/219 |
| 2008/0120424 A1 | 5/2008 | Deshpande | |
| 2010/0111165 A1 | 5/2010 | Kim et al. | |
| 2010/0115366 A1 | 5/2010 | Wang | |
| 2012/0198031 A1* | 8/2012 | Bouazizi | 709/219 |
| 2012/0209952 A1* | 8/2012 | Lotfallah et al. | 709/217 |
| 2012/0297430 A1* | 11/2012 | Morgos et al. | 725/88 |

FOREIGN PATENT DOCUMENTS

| | | |
|---|---|---|
| CN | 101282348 A | 10/2008 |
| CN | 101516057 A | 8/2009 |
| CN | 101547356 A | 9/2009 |

OTHER PUBLICATIONS

Written Opinion of the International Searching Authority dated Sep. 8, 2011 in connection with International Patent Application No. PCT/CN2011/074868.

* cited by examiner

METHOD, SYSTEM, AND CLIENT FOR STREAMING MEDIA SERVICE

CROSS-REFERENCE TO RELATED APPLICATIONS

This application is a continuation of International Application No. PCT/CN2011/074868, filed on May 30, 2011, which claims priority to Chinese Patent No. 201010534936.4, filed on Nov. 8, 2010 all of which are hereby incorporated by reference in their entireties.

TECHNICAL FIELD

The present invention relates to the field of streaming media communications technologies, and in particular, to a method, a system, and a client for a streaming media service.

BACKGROUND

In a conventional streaming media service, an RTP (Real-time Transport Protocol, real-time transport protocol) and an RTSP (Real Time Streaming Protocol, real time streaming protocol) are adopted for transmission of streaming media. This type of streaming media service needs a dedicated streaming server, and the streaming server keeps a one-to-one session connection with a client. The streaming server serves as a controller. The client traces a change of a session state. The streaming server adjusts a streaming media transmission speed according to a network bandwidth, and sends media content to the client. However, this type of streaming server is a server for a special purpose, and during streaming media transmission, a firewall is a hinderer that hinders the transmission of the streaming media, thereby causing usage inconvenience.

The web page is widely used, and a WEB server supports HTTP (Hyper Text Transfer Protocol, hyper text transfer protocol) transmission, and therefore, it is a development trend that streaming media transmission is performed by adopting the HTTP, so as to replace the conventional streaming media service. The streaming media transmission performed by adopting the HTTP focuses on a client. A common HTTP file server may be used as a server, and control of a "session" is completed by the client (an HTTP streaming media service has no session but only a series of HTTP requests and responses that are independent of each other). The server sends a file or a certain part of a file to the client only according to a request of the client, and the client needs to clearly indicate a requested file or a certain requested part of a file. In the prior art, to be adaptive to a change of a network bandwidth, the same content is encoded into versions with different rates. Each version is divided into media segments in a chronological manner. These media segments are stored on an HTTP file server, and these media segments may be separately accessed by the client. The client selects a media segment of a different version (rate) according to an actual transmission rate of a network, and may switch transmission among streaming media segments with different rates according to the change of the network bandwidth.

However, when the network bandwidth changes in a larger range, for example, when the network bandwidth is lower than a lowest coding rate of a streaming media segment stored on the HTTP file server, a streaming media transmission service is interrupted if transmission is performed in an existing manner.

SUMMARY

Embodiments of the present invention provide a method, a system, and a client for a streaming media service, so as to effectively solve a problem that the service is easily interrupted during existing streaming media transmission when a network bandwidth changes in a larger rate.

An embodiment of the present invention provides a method for a streaming media service, where the method includes:

obtaining, by a client, a media presentation description file, where the media presentation description file includes a priority level of a coding representation group of media;

selecting a coding representation group according to the priority level of the coding representation group and a current network bandwidth, and selecting one coding representation from each selected coding representation group; and requesting, according to address information that is of the selected coding representation and is obtained by parsing the media presentation description file, a media segment of the coding representation from a server that is indicated by the address information.

An embodiment of the present invention further provides a system for a streaming media service, where the system includes: a client and a server, where the client is configured to obtain a media presentation description file, where the media presentation description file includes a priority level of a coding representation group of media, select a coding representation group according to the priority level of the coding representation group and a current network bandwidth, and select one coding representation from each selected coding representation group, and request, according to address information that is of the selected coding representation and is obtained by parsing the media presentation description file, a media segment of the coding representation from a server that is indicated by the address information; and the server is configured to pre-store media segments of different representations.

An embodiment of the present invention further provides a client, including:

an obtaining unit, configured to obtain a media presentation description file, where the media presentation description file includes a priority level of a coding representation group of media;

a selecting unit, configured to select a coding representation group according to the priority level of the coding representation group and a current network bandwidth, where the priority level of the coding representation group is obtained by the obtaining unit; and select one coding representation from each selected coding representation group; and a requesting unit, configured to request, according to address information that is of the selected coding representation and is obtained by parsing the media presentation description file that is obtained by the obtaining unit, a media segment of the coding representation from a server that is indicated by the address information.

It can be seen from the technical solutions provided in the embodiments of the present invention that, in the embodiments of the present invention, a client obtains a media presentation description file, where the media presentation description file includes a priority level of a coding representation group of media, selects a coding representation group according to the priority level of the coding representation group and a current network bandwidth, selects one coding representation from each selected coding representation group, and requests, according to address information that is of the selected coding representation and is obtained by parsing the media presentation description file, a media segment of the coding representation from a server that is indicated by the address information. By applying the embodiments of the present invention, priority levels of different coding representation groups of media are indicated in a media presentation description file, so as to match and select a corresponding media segment according to a sequence of the priority levels and a network bandwidth. A coding representation that satisfies the network bandwidth is selected, and a corresponding media segment is requested. A capability of transmitting partial media data in the case of a relatively low network bandwidth is fully used, so that adaptation to network bandwidth fluctuation may be improved, smooth upgrade or degradation of a streaming media transmission service is implemented, and streaming media transmission interruption caused by a change of the network bandwidth is reduced.

BRIEF DESCRIPTION OF DRAWINGS

To describe the technical solutions in the embodiments of the present invention or in the prior art more clearly, the accompanying drawings for describing the embodiments are briefly introduced in the following. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Embodiments of the present invention provide a method, a system, and a client for a streaming media service.

To enable persons skilled in the art to better understand the solutions of the present invention, and make the foregoing objectives, features, and advantages of the present invention more comprehensible, the present invention is described in further detail in the following with reference to the accompanying drawings and specific implementation manners.

The WEB is widely used, and all infrastructures of the WEB, for example, a server and a CDN (Content Distribution Network, content distribution network), support HTTP transmission, and therefore, it is a development trend that streaming media transmission is performed by adopting an HTTP, so as to replace a conventional streaming media service. In the embodiments of the present invention, the HTTP is adopted to perform streaming media transmission. The streaming media transmission focuses on a client. A common HTTP file server may be used as a server, and control of transmission of media data is completed by the client.

In the prior art, if a network bandwidth is insufficient to support transmission of all media components, the client cannot perform selection among representations of different media components. If different media components are multiplexed together (representations of different media components are multiplexed in one coding representation), the client cannot request one or more media components therein. Even though representations of different media components are independent, the client lacks a basis for performing selection among the media components, and a correct decision cannot be made according to only a bit rate of a coding representation. In any of the foregoing cases, a network still has a capability of transmitting partial media data. Therefore, in the embodiments of the present invention, multiple media components are discriminated, and on such a basis, priority levels of coding representation groups that correspond to different media components are discriminated, so as to transmit partial media data when a network bandwidth is relatively low, thereby ensuring that a streaming media service is not interrupted.

Figure 1:
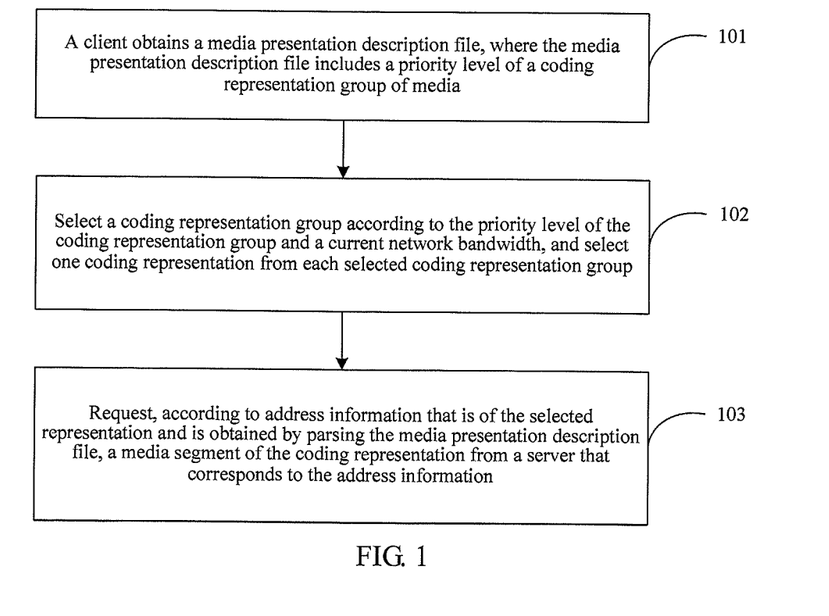
FIG. 1 is a flow chart of a first embodiment of a method for a streaming media service according to the present invention.

FIG. 1 is a flow chart of a first embodiment of a method for a streaming media service according to the present invention.

Step 101: A client obtains a media presentation description file, where the media presentation description file includes a priority level of a coding representation group of media.

To be adaptive to streaming media transmission with a bandwidth that changes in a larger range, in the embodiment of the present invention, media components included in each piece of media content are first discriminated, and representations corresponding to different media components are generated to encode media content. Media components may be classified based on, but not limited to, the type of streaming media content (audio and video are different media types), for example, the media content may be classified into video components and audio components according to a media type. For video that adopts SVC (scalable video coding, Scalable Video Coding), each video coding layer is one media component. Each media component may correspond to multiple coding representations (representation), for example, video coding versions with different rates (bit rates), video coding versions with different resolutions, or audio coding version with different rates (bit rates). A set formed by representations that correspond to the same media component is referred to as a coding representation group (representation group), where representations in the coding representation group may replace each other. At a server side, each HTTP file server may store representations. Because representations that correspond to each media component are a subset of media presentation, the coding representation in the present invention may also be referred to as partial representation (partial representation). The client obtains a media segment of a corresponding representation according to an address of an HTTP file server, for example, a URL (Uniform/Universal Resource Locator, uniform/universal resource locator).

In the embodiment of the present invention, each coding representation in the coding representation group includes the same media component, different priority levels need to be assigned to coding representation groups, and a priority level of a coding representation group may be determined according to at least one piece of the following information: a media type, media bearing information, a media content making manner, media content distribution, and so on. For example, when a priority level is assigned to a coding representation group according to the media type, it is usually considered that a priority level of an audio component is higher than a priority level of a video component, which is not absolute, but is related to media content. For example, for a concert, because a sound is more important than an image, it is reasonable that the priority level of the audio component is higher than the priority level of the video component, while for a football match, because an image is more important than a sound, the priority level of the video component is higher than the priority level of the audio component. Each coding representation group has a lowest bandwidth required for presentation, and therefore, in the embodiment of the present invention, correspondence is preset between coding representation groups of different priority levels and lowest bandwidths required for their presentation.

When the client needs to obtain a streaming media service, the client first needs to obtain a media presentation description file, where the file includes an assigned priority level of a coding representation group described in the foregoing, and address information of a server where a coding representation is located. The media presentation description file may be obtained through a short message, or the media presentation description file may be obtained through an email, or the media presentation description file may be obtained through a webpage catalog.

Step 102: Select a coding representation group according to the priority level of the coding representation group and a current network bandwidth, and select one coding representation from each selected coding representation group.

Specifically, coding representation groups are matched with a current network bandwidth one by one in descending order of priority levels of the coding representation groups; and a set of coding representation groups that the current network bandwidth can satisfy is obtained according to a matching result. That is to say, a bandwidth required by a coding representation group with a highest priority level is compared with the current network bandwidth, and if the bandwidth is smaller than the current network bandwidth, the coding representation group with the highest priority level is selected. Then a bandwidth required by a coding representation group with a second highest priority level is compared with a remaining network bandwidth that is obtained by subtracting a bandwidth allocated to the coding representation group with the highest priority level from the current network bandwidth, and if the bandwidth is smaller than the remaining network bandwidth, the coding representation group with the second highest priority level is selected; and if the bandwidth is greater than the remaining network bandwidth, the selection is ended. The rest is done in the same manner until an available network bandwidth is allocated completely in descending order of the priority levels of the coding representation groups.

Step 103: Request, according to address information that is of the selected representation and is obtained by parsing the media presentation description file, a media segment of the coding representation from a server that is indicated by the address information.

A process of parsing the address information of the coding representation according to the media presentation description file is the same as a process of parsing address information in the prior art, which is not described herein again. In the embodiment of the present invention, a time segment of the coding representation is saved on the server, and is referred to as media segment in the following, which is an access unit of the coding representation in an HTTP streaming media service, where the access unit may be indicated through a uniform resource locator. Therefore, when the network bandwidth is relatively low, media segment transmission can still be implemented, thereby ensuring that the streaming media service is not interrupted.

Figure 2:
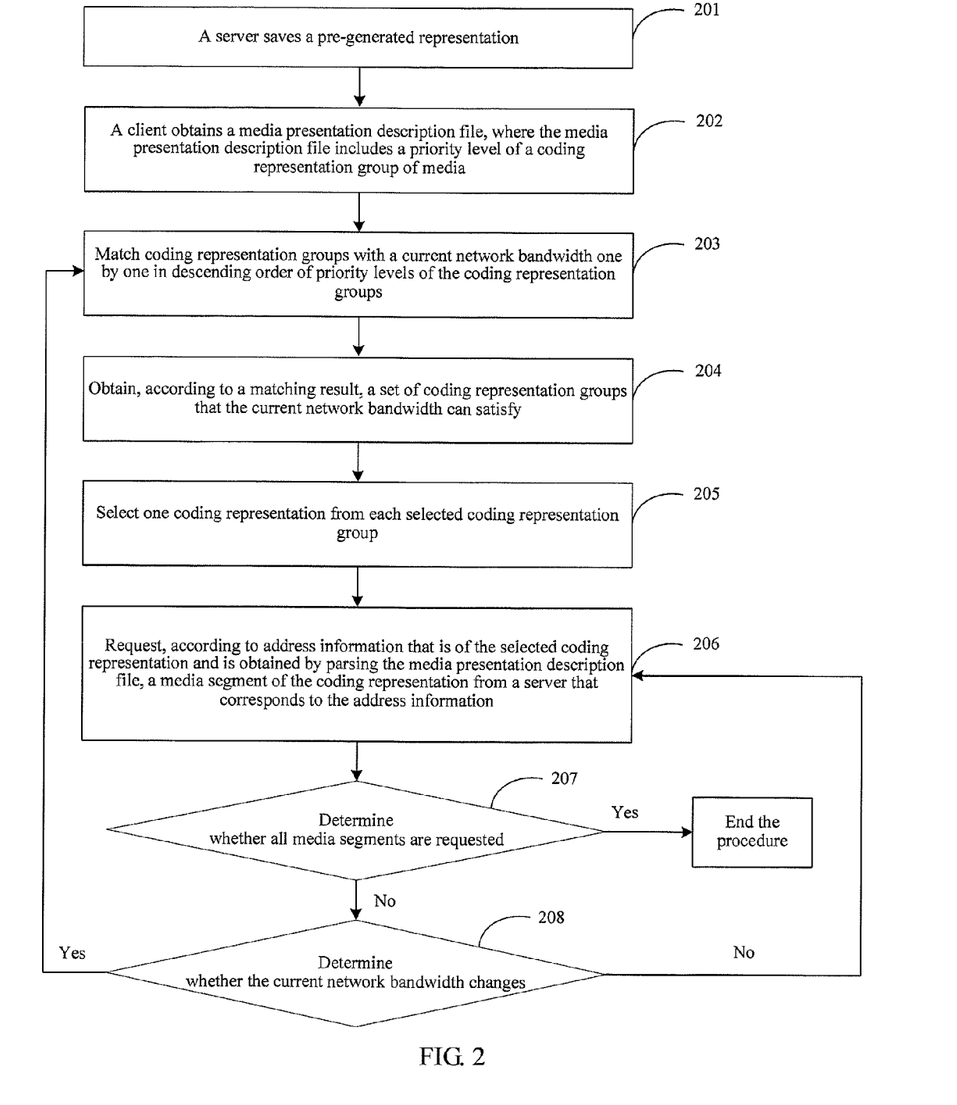
FIG. 2 is a flow chart of a second embodiment of a method for a streaming media service according to the present invention.

FIG. 2 is a flow chart of a second embodiment of a method for a streaming media service according to the present invention. A detailed process of streaming media transmission according to a change of a network bandwidth is shown in this embodiment.

Step 201: A server saves a pre-generated representation.

In the embodiment of the present invention, media components included in each piece of media content are first distinguished, and representations corresponding to different media components are generated to encode media content. Media components may be classified based on, but not limited to, the type of streaming media content (audio and video are different media types). For example, the media content may be classified into video components and audio components according to a media type. For video that adopts SVC, each video coding layer is one media component. Each media component may correspond to multiple coding representations (representation), for example, video coding versions with different rates (bit rates), video coding versions with different resolutions, or audio coding version with different rates (bit rates). A set formed by representations that correspond to the same media component is referred to as a coding representation group (representation group), where representations in the coding representation group may replace each other. At a server side, each HTTP file server may store representations. Because representations that correspond to each media component are a subset of media presentation, the coding representation in the present invention may also be referred to as partial representation (partial representation). A client obtains a media segment of a corresponding representation according to an address of an HTTP file server, for example, a URL.

Step 202: A client obtains a media presentation description file, where the media presentation description file includes a priority level of a coding representation group of streaming media.

In the embodiment of the present invention, different priority levels need to be assigned to coding representation groups, and a priority level of a coding representation group may be determined according to at least one piece of the following information: a media type, media bearing information, a media content making manner, media content distribution, and so on. For example, when a priority level is assigned to a coding representation group according to the media type, the priority level may be assigned according to the importance of different media components in forming integral media presentation.

When the client needs to obtain a streaming media service, the client first needs to obtain a media presentation description file, where the file includes an assigned priority level of a coding representation group described in the foregoing, and address information of a server where a coding representation is located. The media presentation description file may be obtained through a short message, or the media presentation description file may be obtained through an email, or the media presentation description file may be obtained through a webpage catalog.

Step 203: Match coding representation groups with a current network bandwidth one by one in descending order of priority levels of the coding representation groups.

A bandwidth required by a coding representation group with a highest priority level is compared with the current network bandwidth, and if the bandwidth is smaller than the current network bandwidth, the coding representation group with the highest priority level is selected. Then a bandwidth required by a coding representation group with a second highest priority level is compared with a remaining network bandwidth that is obtained by subtracting a bandwidth allocated to the coding representation group with the highest priority level from the current network bandwidth, and if the bandwidth is smaller than the remaining network bandwidth, the coding representation group with the second highest priority level is selected; and if the bandwidth is greater than the remaining network bandwidth, the selection is ended. The rest is done in the same manner until an available network bandwidth is allocated completely in descending order of the priority levels of the coding representation groups.

Step 204: Obtain, according to a matching result, a set of coding representation groups that the current network bandwidth can satisfy.

After the available network bandwidth is allocated completely according to the matching result in step 203, a set of coding representation groups that satisfy a requirement is obtained, where the set includes one or more coding representation groups.

Step 205: Select one coding representation from each selected coding representation group.

It should be noted that, in the foregoing step 203, for a coding representation group that includes multiple coding representations, when the coding representation group is selected according to the priority level, a bandwidth required by a coding representation that occupies a smallest bandwidth in the coding representation group is compared with the current network bandwidth, and a bandwidth is allocated according to the bandwidth required by the coding representation that occupies the smallest bandwidth.

By taking a certain video coding representation group as an example, the video coding representation group includes multiple coding representations that correspond to different rates (bit rates), which are 200 kbps, 300 kbps, 500 kbps, and 800 kbps. Therefore, when a corresponding rate of the coding representation group is matched with the current network bandwidth, a bandwidth required by a coding representation with a rate of 200 kbps is used for matching. When a set of finally selected representation groups includes a video coding representation group, the bandwidth may further be allocated according to the current network bandwidth; and if a current remaining network bandwidth can satisfy video coding representation coding with a higher coding rate, one proper representation may further be selected from the video coding representation group, for example, a certain video coding representation with a bit rate that is higher than 200 kbps may be selected.

Step 206: Request, according to address information that is of the selected coding representation and is obtained by parsing the media presentation description file, a media segment of the coding representation from a server that is indicated by the address information.

Step 207: Determine whether all media segments are requested; if yes, end the procedure; otherwise, perform step 208.

Step 208: Determine whether the current network bandwidth changes; if yes, go back to step 203; otherwise, go back to step 206.

The client may monitor a change of the current network bandwidth in real time, and when the change of the network bandwidth exceeds a threshold, a coding representation group may be re-selected, namely, the procedure returns to step 203 for execution. That is, after a proper coding representation group is selected according to a network bandwidth of a previous time period, the network bandwidth may change after a while. In the embodiment of the present invention, a bandwidth change threshold may be preset, which is, for example, 50 k. When the client obtains, by performing monitoring, that the change of the network bandwidth exceeds 50 k, the procedure needs to go back to step 203, and coding representation groups are re-matched with the current network bandwidth one by one in descending order of the priority levels of the coding representation groups, so as to be adaptive to the change of the network bandwidth.

It can be seen from the foregoing embodiment that, in the present invention, priority levels of different coding representation groups of media are indicated in a media presentation description file, so as to match and select a corresponding media segment according to a sequence of the priority levels and a network bandwidth. A coding representation that satisfies the network bandwidth is selected, and a corresponding media segment is requested. A capability of transmitting partial media data in the case of a relatively low network bandwidth is fully used, so that adaptation to network bandwidth fluctuation may be improved, smooth upgrade or degradation of a streaming media transmission service is implemented, and streaming media transmission interruption caused by a change of the network bandwidth is reduced.

Several application examples of a streaming media service in the method embodiments of the present invention are described in the following, and a major difference between these application examples lies in that classification of coding representation groups are different.

EXAMPLE 1

In this application example, it is assumed that there is a program, and media components of the program include video, audio, commentary and dubbing, and a caption. For media component video, its multiple coding representations correspond to different coding rates, which are 200 kbps, 300 kbps, 500 kbps, and 800 kbps; for media component audio, its coding representation corresponds to a coding rate of 192 kbps; for media component commentary and dubbing, its coding representations correspond to bit rates of 64 kbps, 32 kbps, and 16 kbps; and for a media component caption, a bit rate of its coding representation is 1 kbps.

After streaming media content is classified into different media components according to a transmission requirement, coding representations of the foregoing media components are saved on a server. Different priority levels are assigned to coding representation groups of the classified media components, and the priority levels may be assigned to the coding representation groups according to the importance of different media components in forming integral media presentation. For example, in this example, the priority levels of the coding representation groups are: a caption, commentary and dubbing, audio, and video in descending order. As shown in Table 1 in the following, a priority level of a coding representation group is expressed by a number, where the smaller a number is, the higher a priority level is.

TABLE 1

| Coding representation group number | Coding representation group | Priority level | Description |
| --- | --- | --- | --- |
| A | Video | 4 | Coding rates (200 kbps, 300 kbps, 500 kbps, 800 kbps) |
| B | Audio | 3 | Coding rate (192 kbps) |
| C | Commentary and dubbing | 2 | coding rates (64 kbps, 32 kbps, 16 kbps) |
| D | Caption | 1 | coding rate (1 kbps) |

When a client intends to access a media segment of a coding representation, the client first needs to obtain a media presentation description file (referred to as Media Presentation Description or manifest file), where the client may obtain the media presentation description file in a manner, such as a short massage or an email. The media presentation description file is an ingress of an HTTP streaming media service, and the client may obtain, by parsing the media presentation description file, a URL of an HTTP file server where the coding representation to be accessed is located.

After the client obtains the media presentation description file, where the file carries a priority level sequence of the coding representation groups shown in Table 1, the client first determines, in combination with a current network bandwidth, whether the current network bandwidth can satisfy the coding representation group "caption" with a priority level "1". If the current network bandwidth cannot satisfy the coding representation group "caption", the selection is ended; and if the current network bandwidth can satisfy the coding representation group "caption", a bandwidth allocated to the coding representation group "caption" is subtracted from the current network bandwidth. The client then determines whether a remaining bandwidth can satisfy the coding representation group "commentary and dubbing" with a priority level "2". If the remaining bandwidth cannot satisfy the coding representation group "commentary and dubbing", the selection is ended; and if the remaining bandwidth can satisfy the coding representation group "commentary and dubbing", a bandwidth allocated to the coding representation group "commentary and dubbing" is subtracted from the remaining network bandwidth. The client then determines whether a remaining network bandwidth can satisfy the coding representation group "audio" with a priority level "3". The rest is done in the same manner until an available network bandwidth is allocated completely. Then coding representation groups with a determining result "can satisfy" are used as selected coding representation groups of the client. It can be seen that, in this example, according to the priority level of the coding representation group, under the circumstance that the network bandwidth declines, a streaming media transmission service has the following degradation process: caption+commentary and dubbing+audio+video→caption+commentary and dubbing+audio→caption+commentary and dubbing→caption. Finally, the client selects one coding representation from each selected coding representation group, for example, for the video coding representation group, referring to Table 1, the client may select one coding representation from coding representations with coding rates of 200 kbps, 300 kbps, 500 kbps, and 800 kbps.

It can be seen that, when the network bandwidth declines and becomes insufficient to present all media components, a media component that is matched with the network bandwidth can still be presented according to the method in the foregoing application example. For example, when the network bandwidth becomes very low, as long as the network bandwidth can satisfy the coding representation group "caption", the client may still obtain caption content from a server and present the caption content, thereby ensuring that a streaming media service is not interrupted in the case of a relatively low network bandwidth.

EXAMPLE 2

In this application example, streaming media to be transmitted includes audio and video. A priority level of a coding representation group is determined according to a media content making manner, where the media content making manner means that SVC is adopted in video coding, namely, video codes are classified into different layers, where a higher-layer video code depends on a lower-layer video code, and the higher-layer video code can be decoded only after all lower-layer video codes are obtained. Quality of video output by a client is improved as coding layers of obtained video codes are increased.

In this application example, priority levels of coding representation groups indicated in a media presentation description file may be shown in Table 2 in the following, where priority levels of coding representation groups at different layers are determined according to the media content making manner.

TABLE 2

| Coding Representation representation group number | Priority level | Coding Representation representation group |
| --- | --- | --- |
| A | 4 | Video enhanced layer 2 |
| B | 3 | Video enhanced layer 1 |
| C | 2 | Video basic layer |
| D | 1 | Audio |

In Table 2, the priority levels of the coding representation groups are: audio, a video basic layer, a video enhanced layer 1, and a video enhanced layer 2 in descending order, namely, three coding layers of the video belong to three coding representation groups, where a priority level of a lower-layer video code is higher than that of a higher-layer video code. An audio coding representation group takes precedence over all video coding representation groups.

After the client obtains a media presentation description file, where the file carries a priority level sequence of the coding representation groups shown in Table 2, the client first determines, in combination with a current network bandwidth, whether the current network bandwidth can satisfy the coding representation group "audio" with a priority level "1". If the current network bandwidth cannot satisfy the coding representation group "audio", the selection is ended; and if the current network bandwidth can satisfy the coding representation group "audio", a bandwidth allocated to the coding representation group "audio" is subtracted from the current network bandwidth. The client then determines whether a remaining bandwidth can satisfy the coding representation group "video basic layer" with a priority level "2". If the remaining bandwidth cannot satisfy the coding representation group "video basic layer", the selection is ended; and if the remaining bandwidth can satisfy the coding representation group "video basic layer", a bandwidth allocated to the coding representation group "video basic layer" is subtracted from the remaining network bandwidth. The client then determines whether a remaining network bandwidth can satisfy the coding representation group "video enhanced layer 1" with a priority level "3". The rest is done in the same manner until an available network bandwidth is allocated completely. Then coding representation groups with a determining result "can satisfy" are used as selected coding representation groups of the client. It can be seen that, in this example, according to the priority level of the coding representation group, under the circumstance that the network bandwidth declines, a streaming media transmission service has the following degradation process: high-quality video (video enhanced layer 2+video enhanced layer 1+video basic layer)+audio medium-quality video (video enhanced layer 1+video basic layer)+audio→low-quality video (video basic layer)+audio→audio.

EXAMPLE 3

In this application example, streaming media to be transmitted includes audio and video, where MDC (Multiple Description Video Coding, multiple description video coding) is adopted in video coding, namely, a video code includes multiple code descriptions. Neither a hierarchical relationship nor a dependence relationship exists among different code descriptions. Each code description may be independently decoded, and quality of video output by a client is improved as the number of obtained code descriptions increases. Furthermore, to provide a better streaming media service, a streaming media service provider may distribute different code descriptions through different CDNs (Content Distribution Network, content distribution network). A priority level of a coding representation group is determined according to media content distribution. In this way, a diversity (diversity) of streaming media transmission may be provided, and if a single CDN fails, another CDN may provide media data transmission, which is useful for improving the quality of a streaming media service.

In this application example, priority levels of coding representation groups indicated in a media presentation description file may be shown in Table 3 in the following, where the priority levels of the coding representation groups are determined according to different media content distribution.

TABLE 3

| Coding Representation representation group number | Priority level | Coding Representation representation group |
|---|---|---|
| A | 4 | Video code description 3 |
| B | 3 | Video code description 2 |
| C | 2 | Video code description 1 |
| D | 1 | Audio |

In Table 3, the priority levels of the coding representation groups are: audio, a video code description 1, a video code description 2, and a video code description 3 in descending order, namely, three video code descriptions belong to three coding representation groups. The coding representation groups may be distributed through different CDNs, and the priority levels of the foregoing coding representation groups may be determined according to reliability of a CDN or a selection sequence of a CDN. A priority level of an audio coding representation group is higher than those of all video coding representation groups.

After the client obtains a media presentation description file, where the file carries a priority level sequence of the coding representation groups shown in Table 3, the client first determines, in combination with a current network bandwidth, whether the current network bandwidth can satisfy the coding representation group "audio" with a priority level "1". If the current network bandwidth cannot satisfy the coding representation group "audio", the selection is ended; and if the current network bandwidth can satisfy the coding representation group "audio", a bandwidth allocated to the coding representation group "audio" is subtracted from the current network bandwidth. The client then determines whether a remaining bandwidth can satisfy the coding representation group "video code description 1" with a priority level "2". If the remaining bandwidth cannot satisfy the coding representation group "video code description 1", the selection is ended; and if the remaining bandwidth can satisfy the coding representation group "video code description 1", a bandwidth allocated to the coding representation group "video code description 1" is subtracted from the remaining network bandwidth. The client then determines whether a remaining network bandwidth can satisfy the coding representation group "video code description 2" with a priority level "3". The rest is done in the same manner until an available network bandwidth is allocated completely. Then coding representation groups with a determining result "can satisfy" are used as selected coding representation groups of the client. It can be seen that, in this example, according to the priority level of the coding representation group, under the circumstance that the network bandwidth declines, a streaming media transmission service has the following degradation process: high-quality video (video code description 3+video code description 2+video code description 1)+audio→medium-quality video (video code description 2+video code description 1)+audio→low-quality video (video code description 1)+audio→audio.

Corresponding to the embodiments of the method for a streaming media service according to the present invention, the present invention further provides embodiments of a system and a client for a streaming media service.

Figure 3:
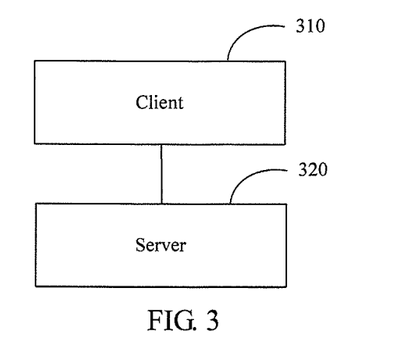
FIG. 3 is a block diagram of an embodiment of a system for a streaming media service according to the present invention.

FIG. 3 is a block diagram of an embodiment of a system for a streaming media service according to the present invention.

The system for a streaming media service includes a client 310 and a server 320.

The client 310 is configured to obtain a media presentation description file, where the media presentation description file includes a priority level of a coding representation group of media, select a coding representation group according to the priority level of the coding representation group and a current network bandwidth, select one coding representation from each selected coding representation group, and request, according to address information that is of the selected coding representation and is obtained by parsing the media presentation description file, a media segment of the coding representation from the server 320 that is indicated by the address information.

The server 320 is configured to pre-store media segments of different representations.

Further, the client 310 is further configured to: when it is obtained, by performing monitoring, that a change of the current network bandwidth exceeds a threshold, go back to execute the selecting a coding representation group according to the priority level of the coding representation group and a current network bandwidth, selecting one coding representation from each selected coding representation group, and requesting, according to address information that is of the selected coding representation and is obtained by parsing the media presentation description file, a media segment of the coding representation from the server 320 that is indicated by the address information.

In the embodiment of the present invention, streaming media transmission is based on an HTTP protocol. Preferably, the server is an HTTP file server. Because media segments of different representations may be stored on different HTTP file servers, the system for streaming media transmission in the foregoing embodiment may include multiple HTTP file servers. In addition, the server may also be an HTTP proxy server (proxy) or a gateway (gateway) in a transmission path, or a cache (cache) in a CDN.

Figure 4:
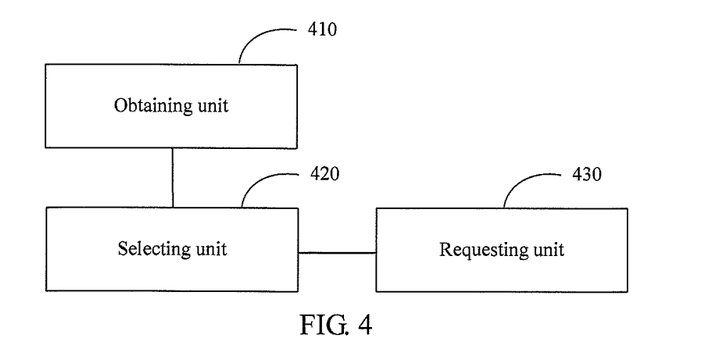
FIG. 4 is a block diagram of a first embodiment of a client according to the present invention.

FIG. 4 is a block diagram of a first embodiment of a client according to the present invention.

The client includes: an obtaining unit 410, a selecting unit 420, and a requesting unit 430.

The obtaining unit 410 is configured to obtain a media presentation description file, where the media presentation description file includes a priority level of a coding representation group of media.

The selecting unit 420 is configured to select a coding representation group according to the priority level of the coding representation group and a current network bandwidth, where the priority level of the coding representation group is obtained by the obtaining unit 410; and select one coding representation from each selected coding representation group.

The requesting unit 430 is configured to request, according to address information is of the selected coding representation and is obtained by parsing the media presentation description file that is obtained by the obtaining unit 410, a media segment of the coding representation from a server that is indicated by the address information.

Figure 5:
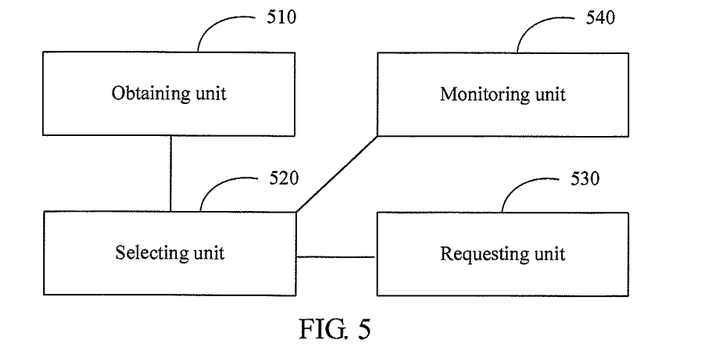
FIG. 5 is a block diagram of a second embodiment of a client according to the present invention.

FIG. 5 is a block diagram of a second embodiment of a client according to the present invention.

The client includes: an obtaining unit 510, a selecting unit 520, a requesting unit 530, and a monitoring unit 540.

The obtaining unit 510 is configured to obtain a media presentation description file, where the media presentation description file includes a priority level of a coding representation group of media.

The selecting unit 520 is configured to select a coding representation group according to the priority level of the coding representation group and a current network bandwidth, where the priority level of the coding representation group is obtained by the obtaining unit 510; and select one coding representation from each selected coding representation group.

The requesting unit 530 is configured to request, according to address information that is of the selected coding representation and is obtained by parsing the media presentation description file that is obtained by the obtaining unit 510, a media segment of the coding representation from a server that is indicated by the address information.

The monitoring unit 540 is configured to: when it is obtained, by performing monitoring, that a change of the current network bandwidth exceeds a threshold, trigger a function of the selecting unit 520.

Specifically, the selecting unit 520 may include (not shown in FIG. 5): a bandwidth matching unit, configured to match coding representation groups with the current network bandwidth one by one in descending order of priority levels of the coding representation groups; and a result obtaining unit, configured to obtain, according to a matching result, a set of coding representation groups that the current network bandwidth can satisfy.

It can be seen from the description of the foregoing implementation manners that, in the embodiments of the present invention, a client obtains a media presentation description file, where the media presentation description file includes a priority level of a coding representation group of media, selects a coding representation group according to the priority level of the coding representation group and a current network bandwidth, selects one coding representation from each selected coding representation group, and requests, according to address information that is of the selected coding representation and is obtained by parsing the media presentation description file, a media segment of the coding representation from a server that is indicated by the address information. By applying the embodiments of the present invention, priority levels of different coding representation groups of media are indicated in a media presentation description file, so as to match and select a corresponding media segment according to a sequence of the priority levels and a network bandwidth. A coding representation that satisfies the network bandwidth is selected, and a corresponding media segment is requested. A capability of transmitting partial media data in the case of a relatively low network bandwidth is fully used, so that adaptation to network bandwidth fluctuation may be improved, smooth upgrade or degradation of a streaming media transmission service is implemented, and streaming media transmission interruption caused by a change of the network bandwidth is reduced.

Persons skilled in the art may clearly understand that the present invention may be accomplished in a software plus a necessary universal hardware platform manner. Based on such an understanding, the technical solutions in the present invention essentially, or the part contributing to the prior art may be implemented in the form of a software product. The computer software product may be stored in a storage medium, such as ROM/RAM, magnetic disk, and optical disk, and includes at least two instructions for enabling a computer device (which may be a personal computer, a server, or a network device) to perform all or a certain part of steps of the methods described in the embodiments of the present invention.

The foregoing implementation manners of the present invention are not intended to limit the protection scope of the present invention. Any modifications, equivalent substitutions, and improvements made within the spirit and principle of the present invention shall all fall within the protection scope of the present invention.

What is claimed is:

1. A method for a streaming media service, the method comprising:
    obtaining, by a client, a media presentation description file, wherein the media presentation description file comprises a priority level of a coding representation group of media;
    selecting a coding representation group according to the priority level of the coding representation group and a current network bandwidth, and selecting one coding representation from each selected coding representation group; and
    requesting, according to address information that is of the selected coding representation and is obtained by parsing the media presentation description file, a media segment of the coding representation from a server that is indicated by the address information;
    wherein selecting the coding representation group according to the priority level of the coding representation group and the current network bandwidth comprises:
        matching coding representation groups with the current network bandwidth one by one in descending order of priority levels of the coding representation groups; and
        obtaining, according to a matching result, a set of coding representation groups that the current network bandwidth can satisfy.

2. The method according to claim 1, wherein obtaining the media presentation description file comprises: obtaining the media presentation description file through a short message, or obtaining the media presentation description file through an email, or obtaining the media presentation description file through a webpage catalog.

3. The method according to claim 1, wherein each coding representation in the coding representation group comprises the same media component; and
    the priority level of the coding representation group is determined according to at least one piece of the following information: a media type, media bearing information, a media content making manner, and media content distribution.

4. The method according to clam 1, further comprising:
pre-storing, by a server, media segments of different representations.

5. A client, comprising:
a processor; and
memory coupled to the processor including instructions that, when executed by the processor, cause the client to:
   obtain a media presentation description file, wherein the media presentation description file comprises a priority level of a coding representation group of media;
   select a coding representation group according to the priority level of the coding representation group and a current network bandwidth; and select one coding representation from each selected coding representation group; and
   request, according to address information that is of the selected coding representation and is obtained by parsing the media presentation description file, a media segment of the coding representation from a server that is indicated by the address information; and
   when it is obtained, by performing monitoring, that a change of the current network bandwidth exceeds a threshold, trigger a function associated with selecting a coding representation group.

6. A method for a streaming media service, the method comprising:
   obtaining, by a client, a media presentation description file, wherein the media presentation description file comprises a priority level of a representation group of media;
   selecting a coding representation group according to the priority level of the coding representation group and a current network bandwidth, and selecting one coding representation from each selected coding representation group;
   requesting, according to address information that is of the selected coding representation and is obtained by parsing the media presentation description file, a media segment of the coding representation from a server that is indicated by the address information; and
   when it is obtained, by performing monitoring, that a change of the current network bandwidth exceeds a threshold, going back the selecting a coding representation group according to the priority level of the coding representation group and a current network bandwidth.

7. A system for a streaming media service, the system comprising:
   a processor coupled to a memory;
   a client and a server, wherein
   the client is coupled to the processor and is configured to:
      obtain a media presentation description file, wherein the media presentation description file comprises a priority level of a coding representation group of media,
      select a coding representation group according to the priority level of the coding representation group and a current network bandwidth,
      select one coding representation from each selected coding representation group, and
      request, according to address information that is of the selected coding representation and is obtained by parsing the media presentation description file, a media segment of the coding representation from a server that is indicated by the address information; and
   the server is configured to:
      pre-store media segments of different representations;
   wherein the client is further configured to:
      when it is obtained, by performing monitoring, that a change of the current network bandwidth exceeds a threshold, go back to selecting a coding representation group according to the priority level of the coding representation group and a current network bandwidth
      select one coding representation from each selected coding representation group, and
      request, according to address information that is of the selected coding representation and is obtained by parsing the media presentation description file, a media segment of the coding representation from a server that is indicated by the address information.

8. A client, comprising:
a processor; and
memory coupled to the processor including instructions that, when executed by the processor, cause the client to:
   obtain a media presentation description file, wherein the media presentation description file comprises a priority level of a coding representation group of media;
   select a coding representation group according to the priority level of the coding representation group and a current network bandwidth; and select one coding representation from each selected coding representation group;
   request, according to address information that is of the selected coding representation and is obtained by parsing the media presentation description file, a media segment of the coding representation from a server that is indicated by the address information;
   match coding representation groups with the current network bandwidth one by one in descending order of priority levels of the coding representation groups; and
   obtain, according to a matching result, a set of coding representation groups that the current network bandwidth can satisfy.

* * * * *